(12) United States Patent
Paavilainen et al.

(10) Patent No.: US 10,746,433 B2
(45) Date of Patent: Aug. 18, 2020

(54) HVAC DAMPER CONTROL

(71) Applicant: HALTON MARINE OY, Lahti (FI)

(72) Inventors: Risto Paavilainen, Lahti (FI); Jukka Maksimainen, Orimattila (FI)

(73) Assignee: HALTON MARINE OY, Lahti (FI)

( * ) Notice: Subject to any disclaimer, the term of this patent is extended or adjusted under 35 U.S.C. 154(b) by 0 days.

(21) Appl. No.: 15/059,376

(22) Filed: Mar. 3, 2016

(65) Prior Publication Data

US 2016/0258651 A1 Sep. 8, 2016

(30) Foreign Application Priority Data

Mar. 3, 2015 (EP) .................................... 15157393

(51) Int. Cl.
*F24F 13/14* (2006.01)
*F24F 13/15* (2006.01)
*F16K 17/36* (2006.01)

(52) U.S. Cl.
CPC .......... *F24F 13/1426* (2013.01); *F16K 17/36* (2013.01); *F24F 13/15* (2013.01); *F24F 2013/146* (2013.01); *F24F 2013/1433* (2013.01); *F24F 2013/1473* (2013.01)

(58) Field of Classification Search
CPC ............... F24F 13/1426; F24F 13/15; F24F 2013/1473; F24F 2013/146; F24F 2013/143; F16K 17/36; F16K 31/05; F16K 1/223
See application file for complete search history.

(56) References Cited

U.S. PATENT DOCUMENTS

| 3,687,415 A * | 8/1972 | Turkot .................. F16K 31/055 |
| | | 251/129.03 |
| 4,190,082 A * | 2/1980 | Hernandez Crespo ...................... |
| | | F16K 11/00 |
| | | 137/625.17 |
| 4,487,214 A * | 12/1984 | Tatum ...................... A62C 2/14 |
| | | 137/601.09 |
| 4,545,363 A | 10/1985 | Barchechat et al. |

(Continued)

FOREIGN PATENT DOCUMENTS

| CN | 203719074 U | 7/2014 |
| EP | 1 347 249 A1 | 9/2003 |
| GB | 2 032 053 A | 4/1980 |

OTHER PUBLICATIONS

European Search Report for Application No. EP 15 15 7393 dated Aug. 12, 2015.

*Primary Examiner* — Jessica Cahill
*Assistant Examiner* — Patrick C Williams
(74) *Attorney, Agent, or Firm* — Alston & Bird LLP

(57) ABSTRACT

A hvac damper control is described. In an example, an apparatus comprises a manual actuator, wherein in a manual use of the manual actuator, the manual actuator is configured to open a hvac damper to an open position and close the damper to a closed position. The apparatus comprises an actuator coupled to a manual actuator, wherein the actuator is configured to open and close the hvac damper by being connected to the manual actuator. When the actuator is connected to propulsion, the actuator is configured to drive itself to the open position, wherein the actuator is configured to lock to the manual actuator. In other examples, a method, a hvac damper, and a hvac system are discussed along with the features of the apparatus.

18 Claims, 13 Drawing Sheets

(56) References Cited

U.S. PATENT DOCUMENTS

| | | | |
|---|---|---|---|
| 4,911,065 A | 3/1990 | Van Becelaere | |
| 5,547,018 A * | 8/1996 | Takahashi | F24F 1/0011 165/122 |
| 6,343,615 B1 * | 2/2002 | Miller | A62C 35/68 137/202 |
| 6,435,211 B2 * | 8/2002 | Stone | F16K 17/383 137/601.12 |
| 7,156,367 B1 * | 1/2007 | Huang | F23N 1/007 251/129.03 |
| 2002/0175305 A1 | 11/2002 | McCabe et al. | |
| 2004/0152412 A1 * | 8/2004 | Gehring | B60H 1/3414 454/153 |

* cited by examiner

HVAC DAMPER CONTROL

BACKGROUND

Hvac, heating, ventilation, air condition, is used in buildings and ships. The ventilation may be a machine or gravity based ventilation, or a hybrid. Such a ventilation system often comprises a hvac damper, which is an example of a closure or a shutter of the ventilation ducts. Examples of the hvac dampers may be fire and/or gas dampers. Hvac dampers are passive fire protection products used in hvac ducts to prevent damage or undesired actions, such as the spread of fire inside the ducts through fire-resistance rated walls and floors. Hvac dampers are similar to fire dampers in fire resistance rating, and also prevent the spread of smoke inside the ducts. For example, when a rise in temperature occurs, the hvac damper shuts-off and closes, usually activated by a thermal element, which melts at temperatures higher than ambient, but low enough to indicate the presence of a fire, allowing springs to close the damper blades. Dampers can also be closed following a receipt of an electrical signal from a fire alarm system utilizing detectors remote from the damper, indicating the sensing of heat or smoke in the building occupied spaces or in the hvac duct system.

Hvac dampers can be controlled by an machine driven actuator or manually open and closed positions. When at a start-up phase, or when a fault occurs, power is not always available for use, such as there is no compressed air or electricity, which is needed in order to obtain an open position for the damper actuator, for example in order to ensure an air supply. It may be required that a user is manually setting the damper in a normal operating position, in case manual use is available. Unfortunately, the manual use enables that the damper is forgotten in the open position. In this case, the damper does not operate in a fault situation as desired, for example it may not close when needed. In addition, the manual use can be a difficult and cumbersome, due to, for example, hvac systems in confined spaces.

If the damper is not equipped with a manual use capability, the damper can be opened using battery power and/or a portable pressure tank. A canister of compressed air or the battery pack can be used to open the damper. Battery or compressed air bottle is an expensive and complex. An advantage of the battery or the compressed air bottle is that the damper cannot remain in the open position, if the fuse of the damper has been triggered.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A hvac damper control is described. In an example, an apparatus comprises a manual actuator, wherein in a manual use of the manual actuator, the manual actuator is configured to open a hvac damper to an open position and close the damper to a closed position. The apparatus comprises an actuator coupled to a manual actuator, wherein the actuator is configured to open and close the hvac damper by being connected to the manual actuator. When the actuator is connected to propulsion, the actuator is configured to drive itself to the open position, wherein the actuator is configured to lock to the manual actuator.

In other examples, a method, a hvac damper, and a hvac system are discussed along with the features of the apparatus.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples may be described and illustrated herein as being implemented in a hvac damper, these are only examples of a shutter or a closure and not a limitation. As those skilled in the art will appreciate, the present examples are suitable for application in a variety of different types of hvac shutters or closures.

Figure 1:
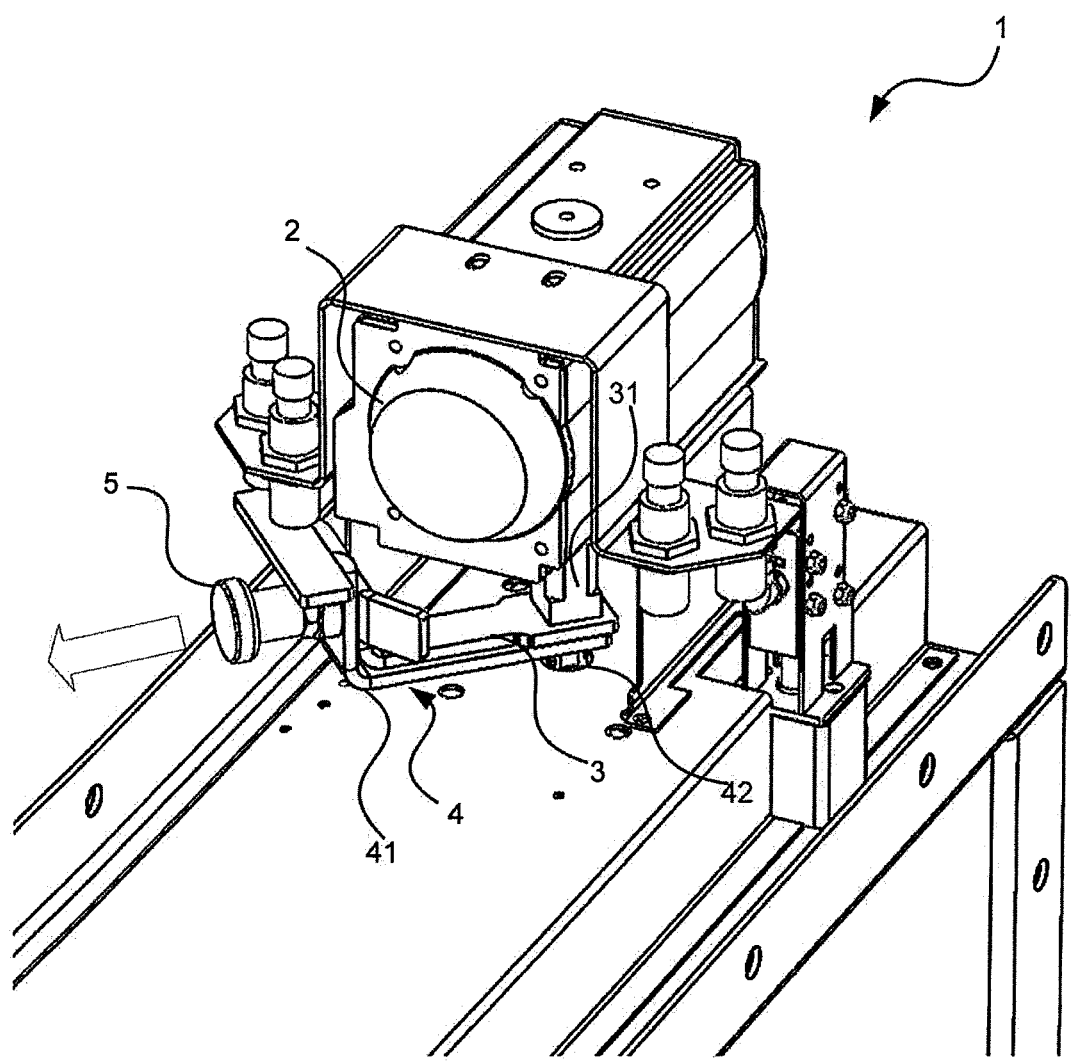
FIG. 1 illustrates a hvac damper in a closed position, according to an illustrative example.
Figure 7:
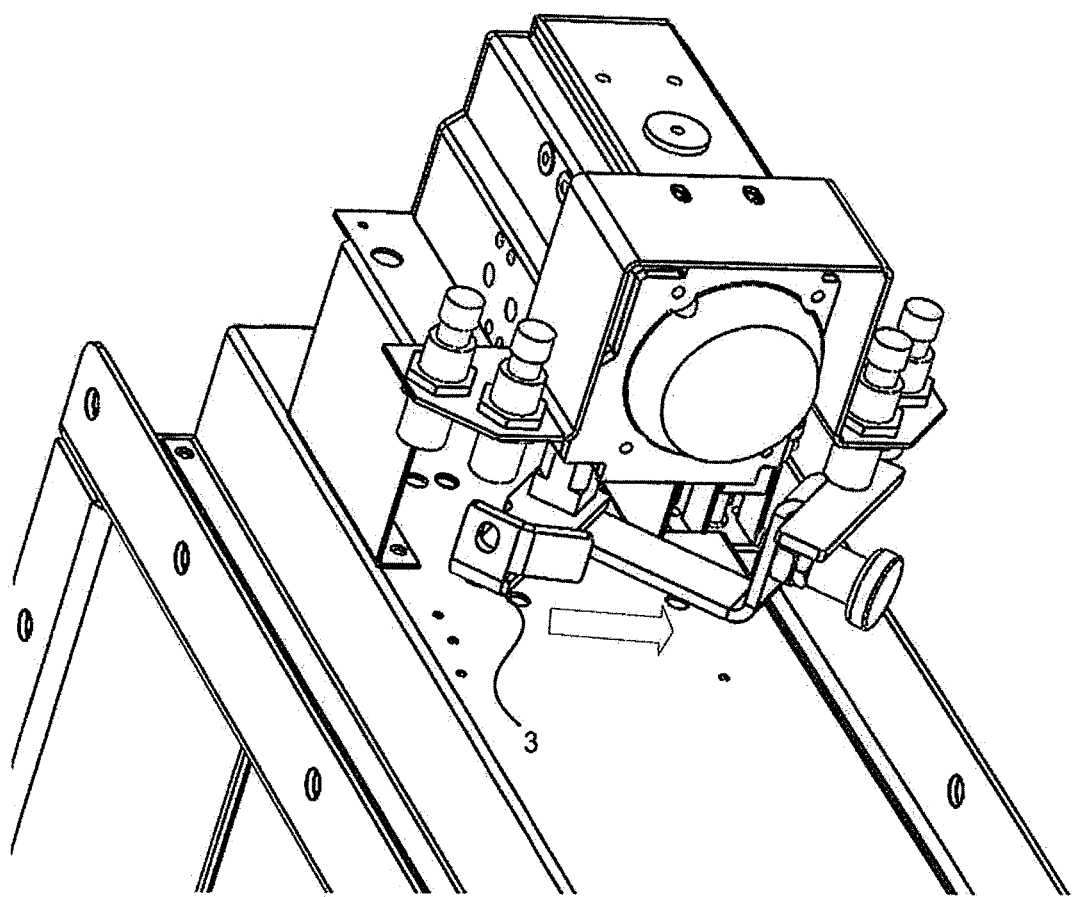
FIG. 7 illustrates an actuator of a hvac damper driving to an open position, according to an illustrative example.
Figure 8:
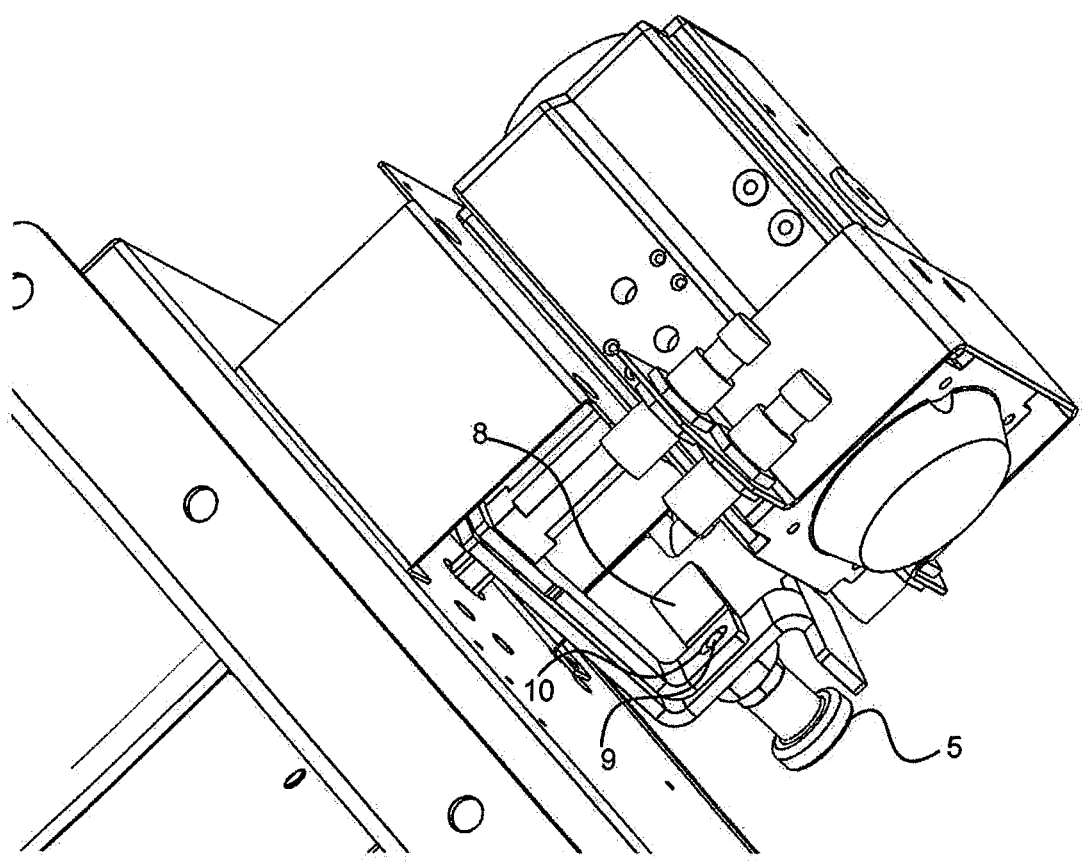
FIG. 8 illustrates a hvac damper in an open position, according to an illustrative example.

Referring to FIG. 1 according to an example, a hvac damper 1 includes an actuator 2 for motorized use. The damper 1 is also configured to a manual use mode, in which the damper 1 can be opened and closed by a manually operated actuator 4, the manual actuator 4, for example as in FIG. 4. The actuator 2 is configured to close and open the damper 1 by coupling to the manual actuator 4, for example as illustrated in FIGS. 1 and 8. When the actuator 2 is connected to propulsion, the automatic actuator 2 is configured to drive itself to the open position as illustrated in FIG. 7. At the same time, the actuator 2 is configured to lock to the manual actuator 4 as illustrated in FIG. 8.

An example may prevent the damper 1 being forgotten in an open position, when the hvac damper system is being activated or exercised. An example may also eliminate a need to physically disable the manual use. When the system is activated, for example, compressed air or electricity being available again, the actuator 2 is activated and drives itself to the open position. At the same time the actuator 2 locks the manual use mode off.

Figure 4:
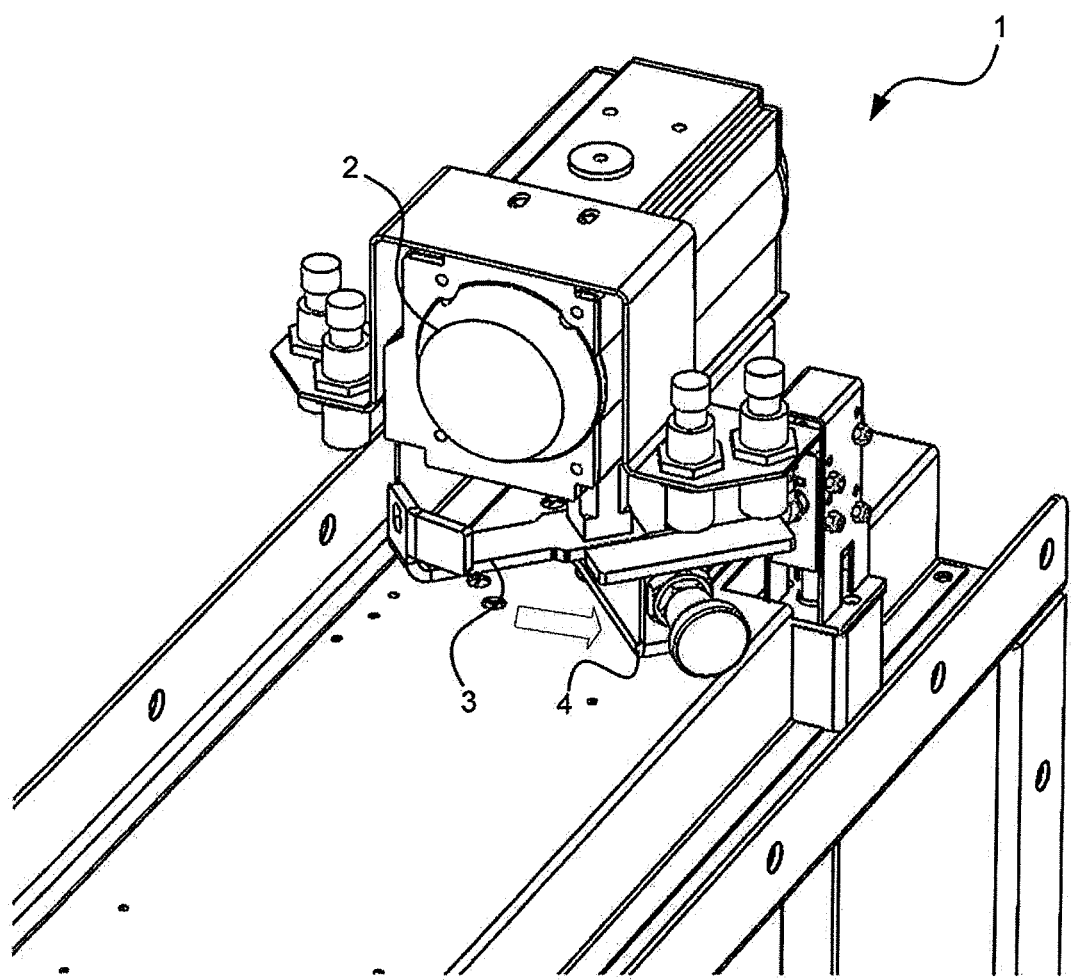
FIG. 4 illustrates a hvac damper opened manually to an open position, in accordance with an illustrative example.

According to an example illustrated in FIG. 1, a hvac damper 1 is equipped with a spring return actuator (the spring is not shown in figures). The spring shuts the damper 1, if power is not available. The actuator 2 can be equipped with a manual use (alternatively and interchangeably referred to as manual mode), wherein the actuator 2 is disconnected from a drive shaft 42 of the damper 1, for example as illustrated in FIG. 4. In a normal operation, for example the motorized use in FIGS. 1 and 8, a lever 41, for example a handle or a grip, of the manual actuator 4 is connected to a lever 3, for example a handle or a grip, of the actuator 2, which is connected to a drive shaft 31. When the actuator 2 is non-powered, the lever 41 of the manual actuator 41 can be manually removed from the lever 3 of the actuator 2, wherein blades 7 of the damper 1 can be set manually to the open position, for example as illustrated in FIG. 4. When the actuator 2 is connected to power, the actuator 2 automatically drives itself to the open position as for example in FIG. 7, and, at the same time, the lever 3 of the actuator 2 will be locked to the lever 41 of the manual actuator 4, wherein the damper 1 is no longer in the manual use, for example as illustrated in FIG. 8.

In an example, it may be ensured that the damper 1 does not remain in the open position, which allows the spread of the flames and gases in case of a fire. Often, the damper 1 is located in a difficult place, to which an access is difficult. According to the example, the need to physically visit the damper 1 may be eliminated or at least reduced after the activation phase.

The actuator 2 may be a type of motor that is responsible for moving or controlling a mechanism or system, for example employ lever 3. It is operated by a source of energy, typically electric current, hydraulic fluid pressure, or pneumatic pressure, and converts that energy into motion. An actuator 2 is the mechanism by which a control system 1400 acts upon an environment. The control system 1400 can be simple (a fixed mechanical or electronic system), software-based (e.g. a printer driver, robot control system), a human, or any other input.

Manual actuator 4 may employs levers 41, gears, or wheels to move mechanism or system. Manual actuator 4 is powered by a human, for example by a hand. Manual actuators 4 are inexpensive, typically self-contained and easy to operate.

According to an example of the locking of the levers 3,41 can be implemented by various ways. For example, the locking is implemented by a spring returned pin 9. Alternatively, the locking may implemented by pneumatics or electrically, instead of the spring.

FIG. 1 illustrates a hvac damper 1. In the example of FIG. 1 the damper 1 is in a closed position. In the closed position blades 6 of the damper 1 are shut-off. The damper 1 can shut-off the ventilation ducts (not shown in figures). The damper 1 comprises a spring return actuator 2. The spring return actuator 2 is configured to shut-off the blades 6, when the actuator 2 is connected to a manual actuator 4, even when the damper 1 is not powered. For example, in a possible emergency situation. The spring of the actuator 2 is configured to return the damper 1 to the closed position, when the manual actuator 4 is connected to the actuator 2.

The actuator 2 is configured to drive the damper 1 to an open position and to the closed position by a power, possibly automatically, without a user moving the manual actuator 4. The manual actuator 4 is configured to drive the damper 1 manually to the open position and to the closed position, for example powered by a user manually moving the manual actuator 4. The manual actuator 4 is connected to the blades 6 by a shaft 42. Furthermore, the manual actuator 4 may be connected to the actuator 2, for example by the levers 3,41 and their locking. The actuator 2 is also connected to the lever 3 by a shaft 31. Consequently, a movement of the manual actuator 4 moves the blades 6. Furthermore, a movement of the actuator 2 moves the manual actuator 4, when they are connected. When the manual actuator 4 is connected to the actuator 2, the damper is in a motorized mode or an automatic use.

Referring to FIG. 1, the lever 41 of the manual actuator 4 includes a knob 5. By pulling the knob 5, the lever 41 of the manual actuator 4 is released from being connected to the lever 3 of the actuator 2. Consequently, the damper enters into a manual use or manual mode. The manual use is released.

Figure 2:
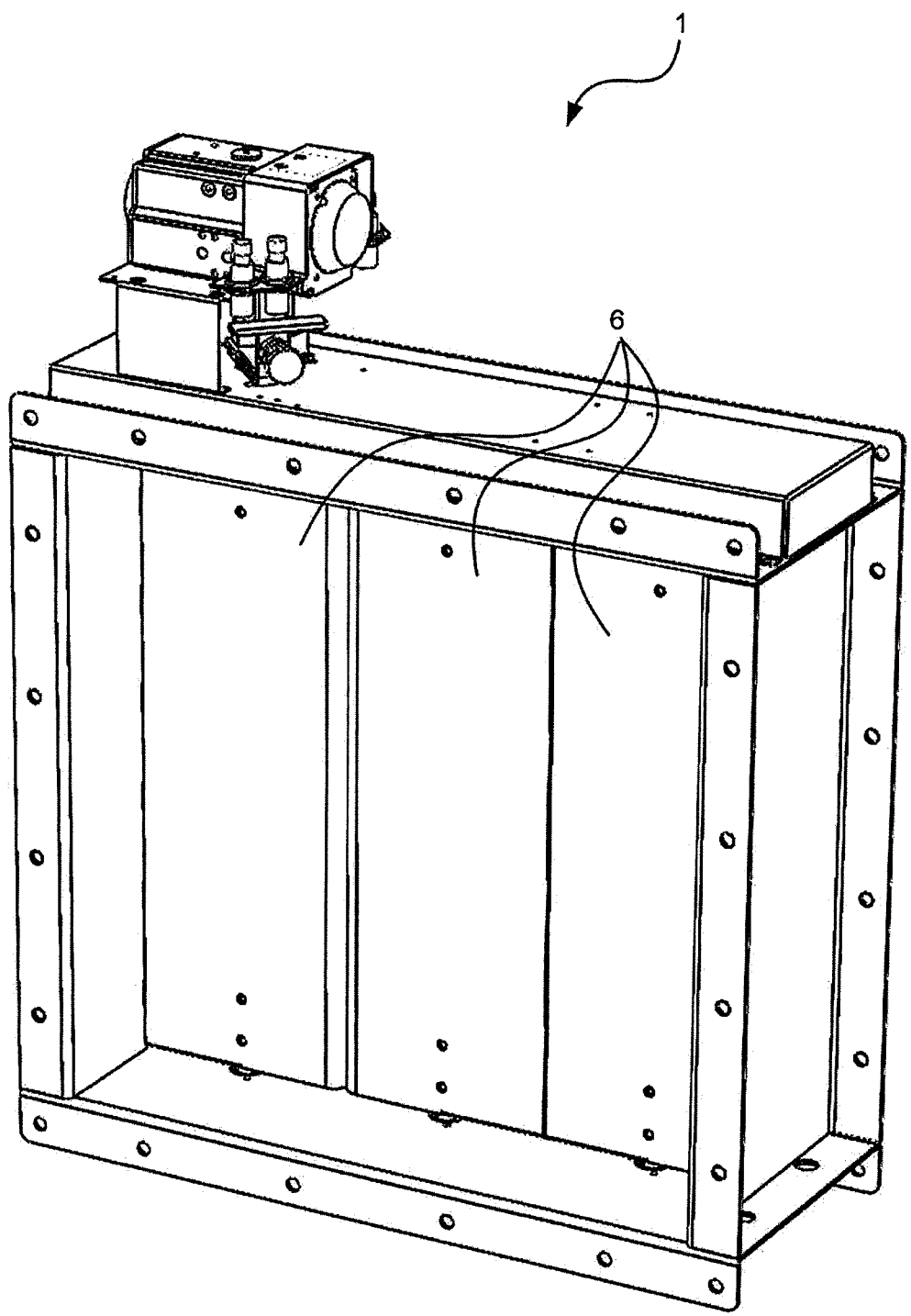
FIG. 2 and FIG. 3 illustrate a hvac damper in a closed position, according to an example.
Figure 3:
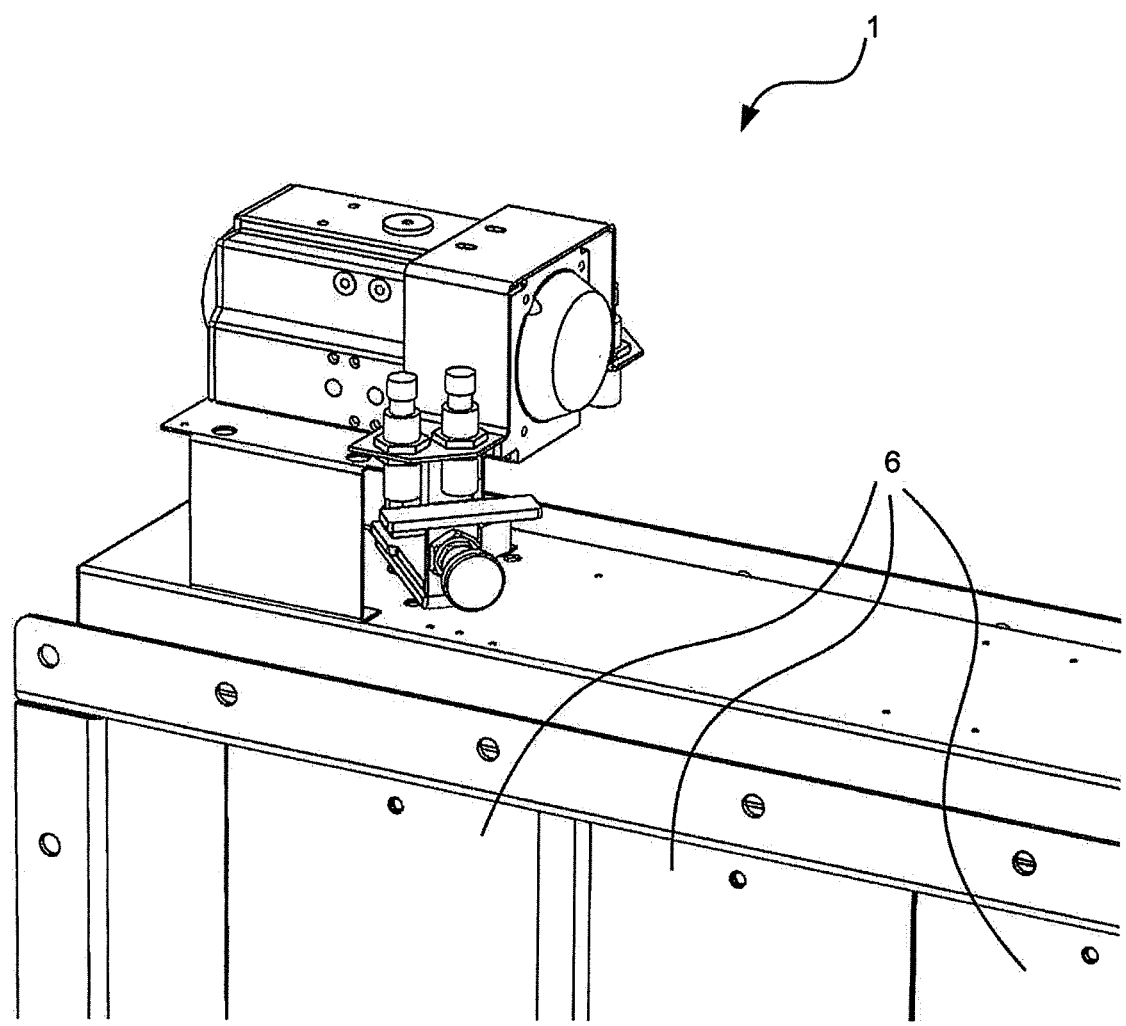

FIG. 2 and FIG. 3 illustrate the damper 1 in the closed position. Furthermore, the motorized mode is on in the example. The actuators 2 and 4 are locked and connected to each other.

FIG. 4 illustrates a hvac damper 1 opened manually to an open position, in accordance with an illustrative example. The lever 3 is connected to the actuator 2. The manual actuator 4 is connected to the blades 6. However, the levers 3 and 41 are released. By moving the manual actuator 2 as shown by an arrow, the blades 7 are moved to an open position. Thus, the damper 1 enters to the open position. The actuator 2 is not moved.

Figure 5:
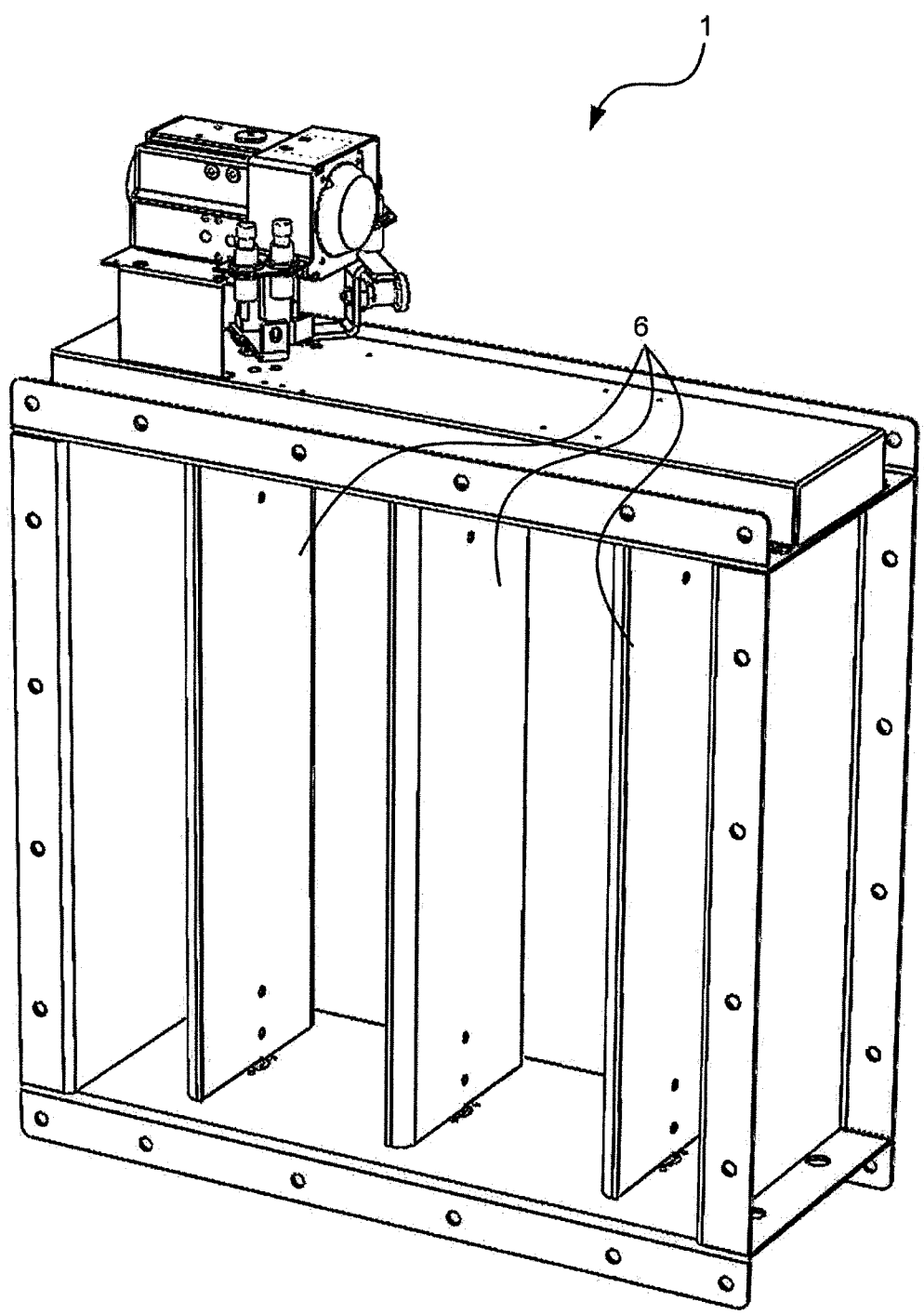
FIG. 5 and FIG. 6 illustrate a hvac damper in an open position, according to an example.
Figure 6:
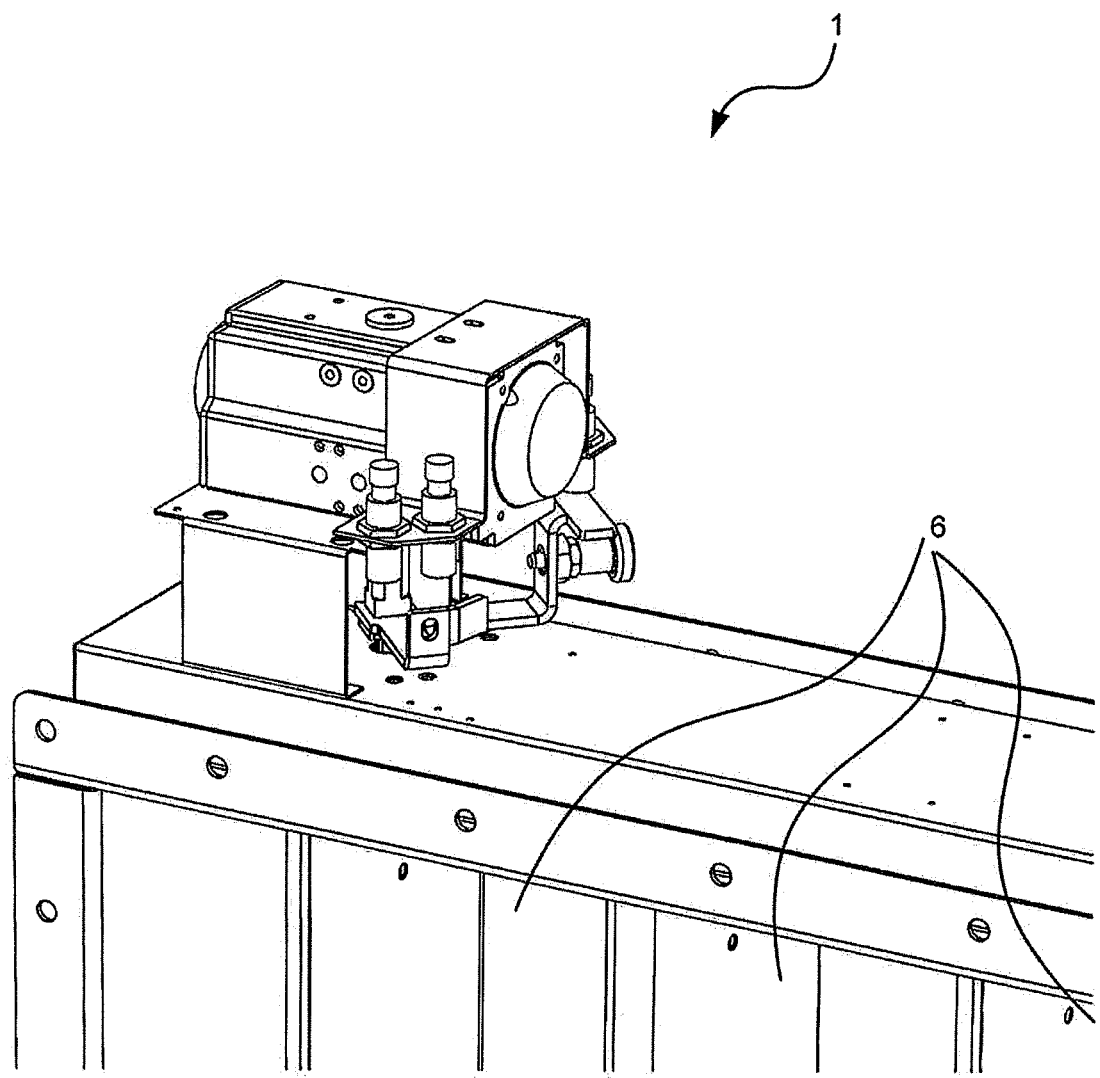

FIG. 5 and FIG. 6 illustrate a hvac damper in an open position, according to an example. Furthermore, the manual use in on. This may be referred to as a manual override.

FIG. 7 illustrates an actuator 2 of a hvac damper 1 driven to an open position, according to an illustrative example. In the example, the damper 1 has been without a power. Then the actuator 2 is energized, for example the damper 1 is powered. The actuator 2 is configured to drive itself to the open position. This is shown by an arrow in FIG. 7. A lever 3 of the actuator 2 is moving according to the arrow. The manual actuator 4 is not moving.

FIG. 8 illustrates a hvac damper 1 in an open position, according to another example. In the example of FIG. 8, a projection 8 of the actuator 2 is shown. The lever 3 of the actuator 2 includes the projection 8. The projection 8 is configured to push a spring returned pin 9 into the knob 5. This may take place while the actuator 2, and the lever 3 respectively, is moving to the fully open position. When the actuator 2 has been moved to approximately to the end position, the pin 9 slides into a hole 10 of the lever 3. The pin 9 locks into the hole 10. The pin 9 is pushed into the hole 10 by the return spring. Consequently, the lever 3 of the actuator 2 is connected or locked to the lever 41 of the manual actuator 4. The damper 1 has been returned to the normal mode, i.e. the motorized mode. The lever 3 or the actuator 2 may now drive the damper 1 to the open and close position.

Figure 9:
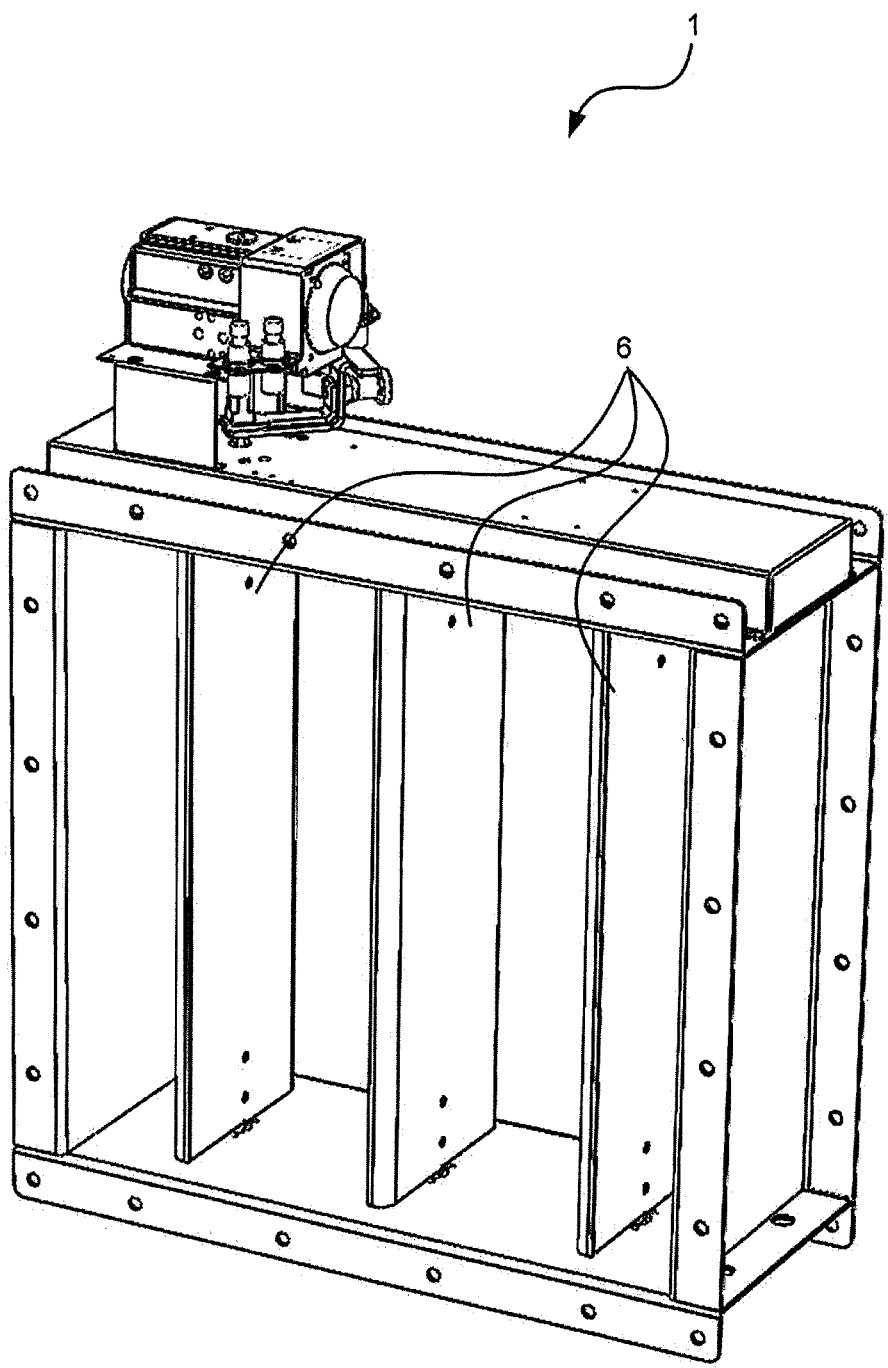
FIG. 9 and FIG. 10 illustrate a hvac damper in an open position, according to an example.
Figure 10:
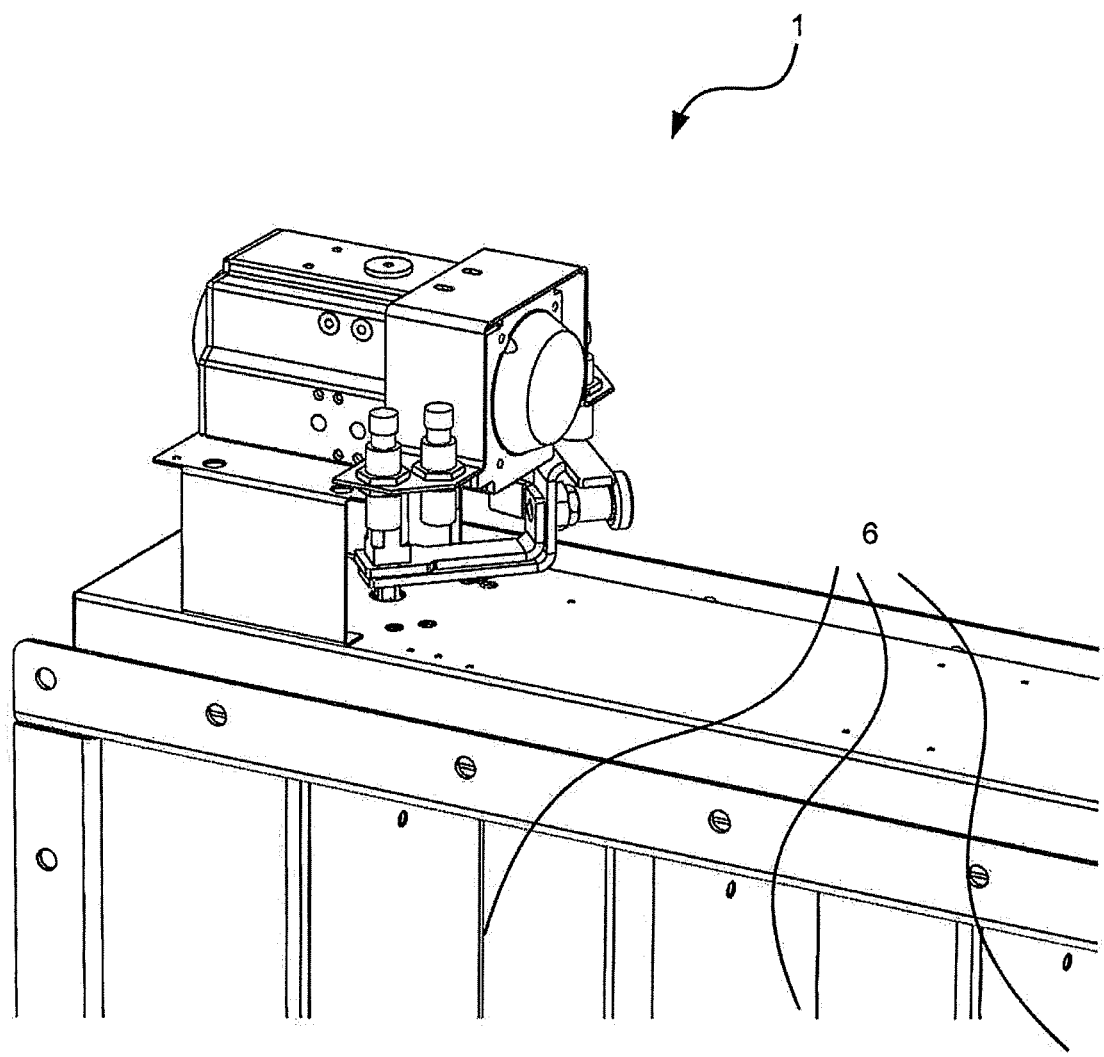

FIG. 9 and FIG. 10 illustrate a hvac damper 1 in an open position, according to an example. In the example the actuator 2 and the lever 3 is locked to lever 41 and to the manual actuator 4. Consequently the actuator 2 is connected to the blades 6.

Figure 11:
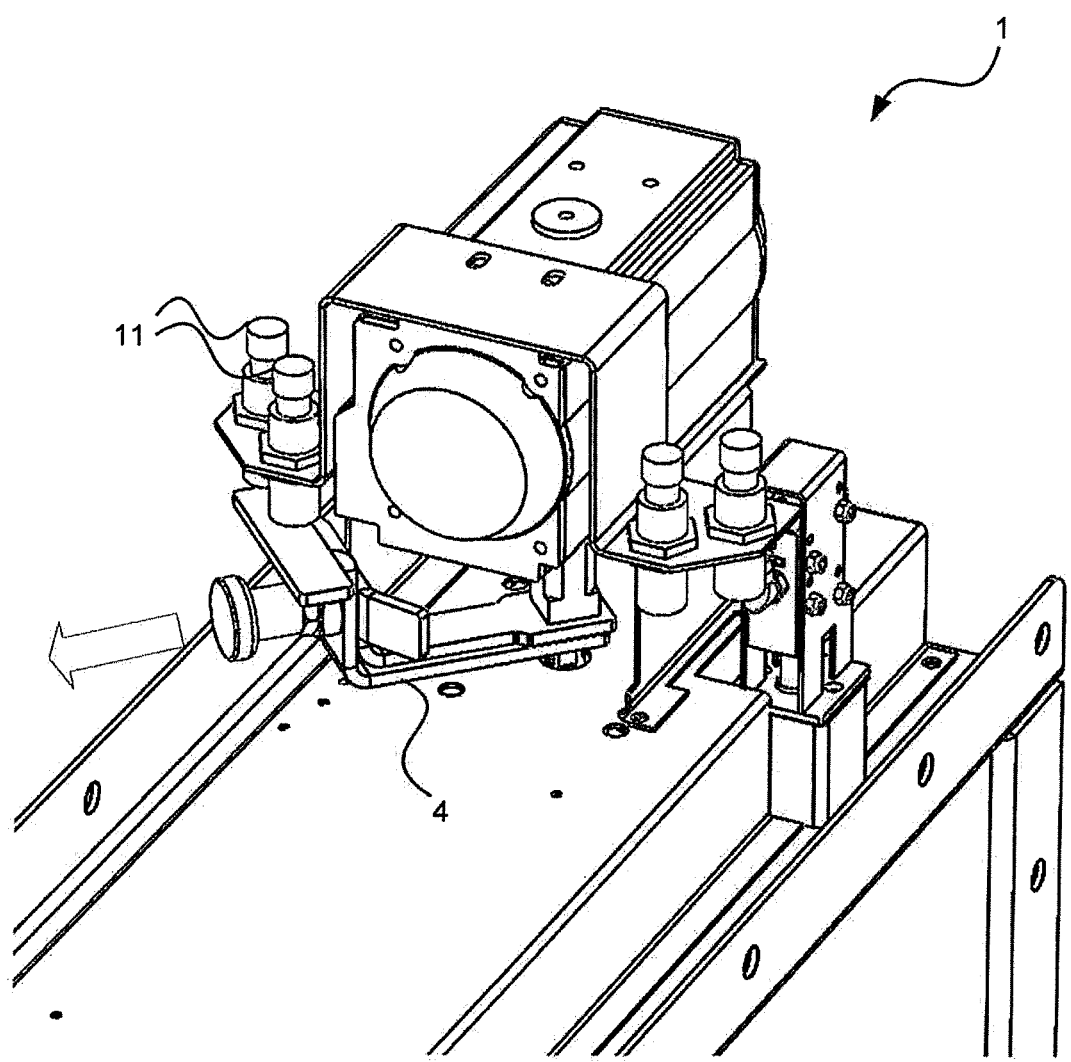
FIG. 11 and FIG. 12 illustrate examples of detectors, according to an example.
Figure 12:
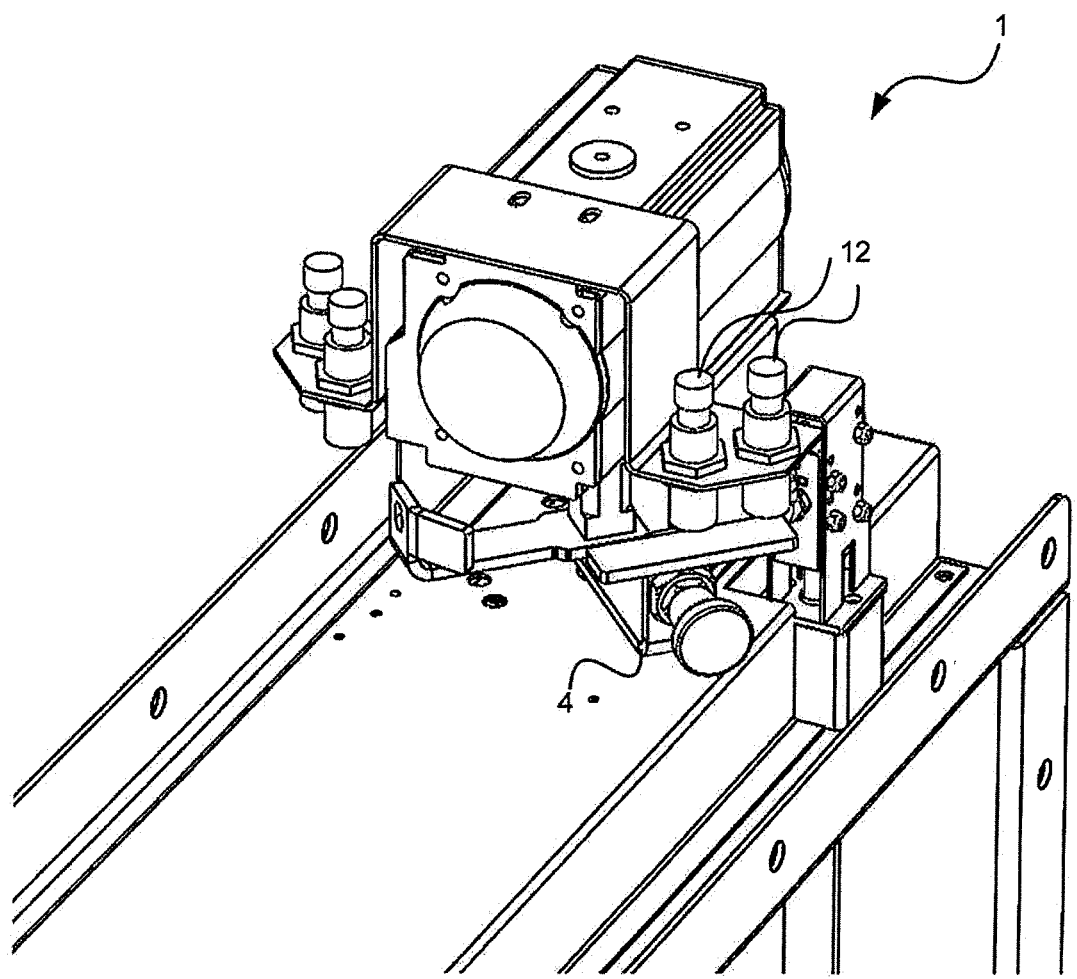

In an example the damper 1 includes detectors 11, 12. The detectors 11, 12 are configured to detect whether the damper 1 is in the open position or in the closed position. Detectors 11 are configured to detect whether the lever of the manual actuator 4 is at the closed position as for example shown in FIG. 11. Detectors 12 are configured to detect whether the lever of the manual actuator 4 is at the open position as for example shown in FIG. 12. The detectors 11,12 may be connected electrically to a detection device, such as a computing apparatus, etc. The detectors 11,12 may communicate signals indicating whether the damper 1 is in the open or closed position. This way a confirmation of the current position may be achieved.

Figure 13:
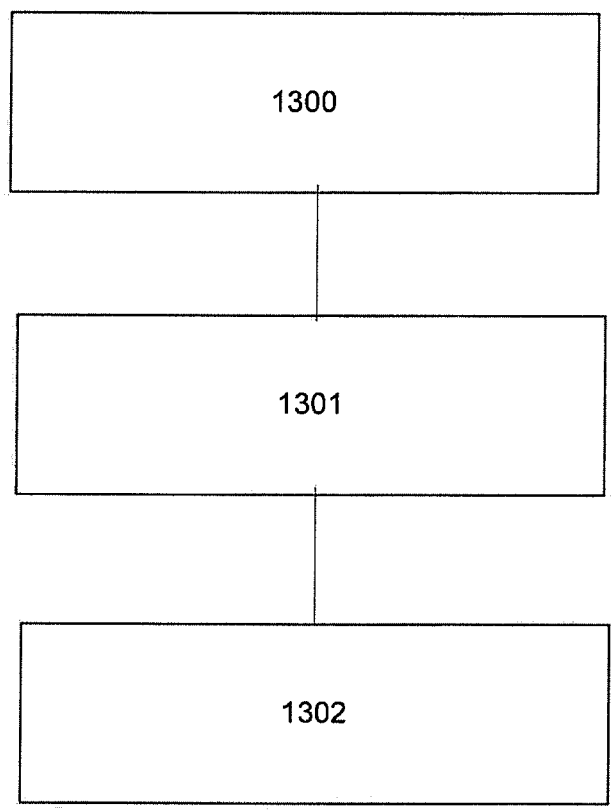
FIG. 13 illustrates an example of a method.

FIG. 13 is an example of a flow diagram of the method. In the step 1300, there is being opened and closed a hvac damper 1 to an open position and to a closed position, by an actuator 2 coupled to a manual actuator 4, by connected the actuator 2 to the manual actuator 4. In the step 1301, there is being connected the actuator 2 to propulsion. In the step 1302, there is being driven, by the actuator 2, the actuator 2 to the open position, wherein the actuator 2 is configured to lock to the manual actuator 4.

Any range or device value given herein may be extended or altered without losing the effect sought. Also any example may be combined to another example unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus, comprising:
 a manual actuator, wherein, in a manual use of the manual actuator, the manual actuator is configured to open a hvac damper to an open position and to close the hvac damper to a closed position, and
 an actuator detachably coupled to the manual actuator, wherein the actuator is configured to open and close the hvac damper by being connected to the manual actuator, wherein the actuator comprises a lever that includes a coupling configured to release the manual actuator from the actuator;
 wherein, when the actuator is detached from the manual actuator and is connected to propulsion, the actuator is configured to be driven to the open position, so as to lock to the manual actuator without a user interaction such that movement of the actuator is arranged to move the manual actuator in an opening direction and in a closing direction.

2. The apparatus of claim 1, wherein the actuator is configured to be activated by connecting the actuator to propulsion after a power of the propulsion has been down, and wherein the actuator is configured to be driven to the open position without a user interaction.

3. The apparatus of claim 1, wherein the manual use of the manual actuator is configured to be prevented, when the actuator is configured to lock to the manual actuator.

4. The apparatus of claim 1, wherein the actuator comprises a motor configured to open and close the hvac damper.

5. The apparatus of claim 1, wherein the actuator includes a spring configured to return the actuator to the closed position without the propulsion.

6. The apparatus of claim 1, wherein the manual actuator is configured to open the hvac damper defining at least one blade configured to close a ventilation duct in the closed position and open the ventilation duct in the open position.

7. The apparatus of claim 6, further comprising a shaft connecting the manual actuator to the at least one blade.

8. The apparatus of claim 1, wherein the coupling is configured to lock the lever of the actuator to a lever of the manual actuator.

9. The apparatus of claim 1, further comprising a lever of the manual actuator, and wherein the lever of the actuator and the lever of the manual actuator are configured to be locked to each other for locking the actuator to the manual actuator.

10. The apparatus of claim 1, the actuator further comprising a shaft connected to the lever.

11. The apparatus of claim 1, further including a detector configured to detect whether the damper is in the open position or closed position.

12. A hvac damper system comprising the apparatus of claim 1.

13. A hvac system comprising the hvac damper system of claim 12.

14. The apparatus of claim 1, further comprising a lever of the manual actuator.

15. The apparatus of claim 14, wherein the lever of the manual actuator includes a coupling configured to lock the lever of the manual actuator to the lever of the actuator.

16. The apparatus of claim 15, wherein the coupling of the manual actuator includes a pin configured to lock the lever of the manual actuator to the lever of the actuator.

17. The apparatus of claim 16, wherein the pin is powered by a spring, pneumatics, electricity, or hydraulic.

18. A method comprising: opening and closing a hvac damper to an open position and to a closed position, by an actuator detachably coupled to a manual actuator via a lever comprising a coupling; decoupling the actuator from the manual actuator via the coupling of the lever and opening and closing the hvac damper to the open position and to the closed position by the manual actuator; connecting the actuator to propulsion; and driving the actuator to the open position, so as to lock to the manual actuator without a user interaction such that movement of the actuator is arranged to move the manual actuator in an opening direction and in a closing direction.

* * * * *